United States Patent
Mueller et al.

(10) Patent No.: US 11,439,952 B2
(45) Date of Patent: Sep. 13, 2022

(54) LOW TEMPERATURE NITROGEN OXIDE ADSORBER

(71) Applicant: UMICORE AG & CO. KG, Hanau-Wolfgang (DE)

(72) Inventors: Elena Mueller, Pfungstadt (DE); Kris Driesen, Olen (BE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 17/282,850

(22) PCT Filed: Nov. 8, 2019

(86) PCT No.: PCT/EP2019/080633
§ 371 (c)(1),
(2) Date: Apr. 5, 2021

(87) PCT Pub. No.: WO2020/099253
PCT Pub. Date: May 22, 2020

(65) Prior Publication Data
US 2021/0346842 A1    Nov. 11, 2021

(30) Foreign Application Priority Data
Nov. 16, 2018  (EP) .................................... 18206662

(51) Int. Cl.
| | | |
|---|---|---|
| *B01D 53/94* | (2006.01) | |
| *B01J 23/14* | (2006.01) | |
| *B01J 23/44* | (2006.01) | |
| *B01J 37/02* | (2006.01) | |
| *F01N 3/20* | (2006.01) | |
| *F01N 3/28* | (2006.01) | |

(52) U.S. Cl.
CPC ....... *B01D 53/9422* (2013.01); *B01D 53/944* (2013.01); *B01D 53/9418* (2013.01); *B01D 53/9468* (2013.01); *B01D 53/9477* (2013.01); *B01J 23/14* (2013.01); *B01J 23/44* (2013.01); *B01J 37/0215* (2013.01); *F01N 3/2066* (2013.01); *F01N 3/2803* (2013.01); *B01D 2255/1021* (2013.01); *B01D 2255/1023* (2013.01); *B01D 2255/2063* (2013.01); *B01D 2255/2065* (2013.01); *B01D 2255/2094* (2013.01); *B01D 2255/20738* (2013.01); *B01D 2255/20746* (2013.01); *B01D 2255/20761* (2013.01); *B01D 2255/50* (2013.01); *B01D 2255/904* (2013.01); *B01D 2255/9022* (2013.01); *B01D 2255/91* (2013.01); *F01N 2370/04* (2013.01)

(58) Field of Classification Search
CPC .......... B01D 2252/10; B01D 2253/104; B01D 2259/40088; B01D 53/9477; B01D 53/04; B01D 53/9481; B01D 2253/1124; B01D 2257/404; B01D 53/9422; B01D 2258/012; B01D 2255/2063; B01D 2255/9022; B01D 53/9468; B01D 2255/2065; B01D 2255/1021; B01D 53/9418; B01D 2255/50; B01D 2255/2094; B01D 2255/20761; B01D 2255/1023; B01D 2255/20738; B01D 2255/20746; B01D 2255/904; B01D 2255/91; B01J 20/3085; B01J 20/08; B01J 20/3071; B01J 23/626; B01J 23/10; B01J 23/38; B01J 37/0215; B01J 23/14; B01J 23/44; F01N 3/28; F01N 2370/02; F01N 3/2066; F01N 3/0842; F01N 2570/14; F01N 3/2803; F01N 2370/04; C01F 7/78; C01F 7/00; C01F 17/00; C01F 17/32; C01F 17/34; C01G 19/02; C01P 2002/52; Y02T 10/12
See application file for complete search history.

(56) References Cited

U.S. PATENT DOCUMENTS

| | | |
|---|---|---|
| 6,709,644 B2 | 3/2004 | Zones et al. |
| 8,617,474 B2 | 12/2013 | Bull et al. |
| 10,428,708 B2 | 10/2019 | Utschig et al. |
| 2008/0141661 A1 | 6/2008 | Voss et al. |

(Continued)

FOREIGN PATENT DOCUMENTS

| | | | | |
|---|---|---|---|---|
| CN | 104475006 A | | 4/2015 | |
| CN | 109 475 816 A | * | 3/2019 | ............. B01J 23/63 |

(Continued)

OTHER PUBLICATIONS

Vasile, A., et al. Electrical and catalytic properties of cerium-tin mixed oxides in CO depollution reaction. Applied Catalysis B: Environmental. 2013. vol. 140-141, pp. 25-31.

Li, X., et al. A Ce—Sn—$O_x$ catalyst for the selective catalytic reduction of $NO_x$ with $NH_3$. Catalysis Communications, El Sevier NLD. 2013. vol. 405, pp. 47-50.

(Continued)

*Primary Examiner* — Timothy C Vanoy
(74) *Attorney, Agent, or Firm* — Smith, Gambrell & Russell, LLP

(57) ABSTRACT

The present invention relates to a composite metal oxide which comprises 80 to 97 wt %, in relation to the weight of the composite metal oxide, of one or more oxides of cerium and 3 to 20 wt %, in relation to the composite metal oxide of a metal oxide comprising tin oxide ($SnO_2$) and lanthanum oxide ($La_2O_3$) and/or aluminum oxide ($Al_2O_3$), a composite material for the storage of nitrogen oxides which comprises such composite metal oxide and palladium, as well as an exhaust gas system containing said composite material.

20 Claims, No Drawings

(56) References Cited

U.S. PATENT DOCUMENTS

| | | |
|---|---|---|
| 2009/0320457 A1 | 12/2009 | Wan |
| 2014/0322112 A1 | 10/2014 | Blakeman et al. |
| 2015/0226718 A1 | 8/2015 | Holt et al. |
| 2016/0279608 A1 | 9/2016 | Bisson et al. |
| 2020/0316565 A1* | 10/2020 | Fisher .................. B01J 23/10 |
| 2020/0376466 A1* | 12/2020 | Shimamoto ............ B01J 21/04 |

FOREIGN PATENT DOCUMENTS

| | | |
|---|---|---|
| EP | 0 885 650 A2 | 12/1998 |
| EP | 1 420 149 A2 | 5/2004 |
| EP | 1 433 519 A1 | 6/2004 |
| EP | 1 820 561 A1 | 8/2007 |
| EP | 2 505 803 A2 | 10/2012 |
| GB | 2 560 926 A * | 10/2018 ........... B01J 23/005 |
| JP | 2013-198888 A | 10/2013 |
| JP | 2016-052637 A | 4/2016 |
| WO | 02/095398 A1 | 11/2002 |
| WO | 2008/047170 A1 | 4/2008 |
| WO | 2008/106519 A1 | 9/2008 |
| WO | 2008/118434 A1 | 10/2008 |
| WO | 2008/132452 A2 | 11/2008 |
| WO | 2012/029050 A1 | 3/2012 |
| WO | 2012/071421 A2 | 5/2012 |
| WO | WO 2012 085 564 A1 * | 6/2012 ........... B01J 23/626 |
| WO | 2012/156883 A1 | 11/2012 |
| WO | 2014/184568 A1 | 11/2014 |
| WO | 2016/020351 A1 | 2/2016 |
| WO | WO 2017 212 219 A1 * | 12/2017 .......... B01J 37/0203 |

OTHER PUBLICATIONS

International Preliminary Report on Patentability dated May 18, 2021 for International Patent Application No. PCT/EP2019/080633 (6 pages).

Written Opinion dated Jan. 8, 2021 for International Patent Application No. PCT/EP2019/080633 (5 pages).

International Search Report dated Jan. 8, 2020 for International Patent Application No. PCT/EP2019/080633 (3 pages).

DIN 66132: Bestimmung der spezifischen Oberfläche von Feststoffen durch Stickstoffadsorption; Einpunkt-Differenzverfahren nach Haul und Dümbgen. [Determination of specific surface area of solids by adsorption of nitrogen; single-point differential method according to Haul and Dümbgen.] Standard by Deutsches Institut Fur Normung E.V. [German National Standard], 1975. 5 pages in German with English machine translation.

Miyoshi, N., et al. Development of New Concept Three-Way Catalyst for Automotive Lean-Burn Engines. SAE Technical Paper Series 950809. 1995. pp. 121-130.

Mayer. T. Dissertation, Feststoff-SCR-System auf Basis von Ammoniumcarbamat. 2005 (157 pages—English Abstract).

* cited by examiner

LOW TEMPERATURE NITROGEN OXIDE ADSORBER

The present invention relates to a low temperature nitrogen oxide adsorber for the storage of nitrogen oxides from the exhaust gas of a combustion engine, which comprises palladium supported on a composite oxide comprising oxides of cerium and tin.

The exhaust gas of motor vehicles that are operated with lean-burn combustion engines, such as diesel engines, also contain, in addition to carbon monoxide (CO) and nitrogen oxides ($NO_x$), components that result from the incomplete combustion of the fuel in the combustion chamber of the cylinder. In addition to residual hydrocarbons (HC), which are usually also predominantly present in gaseous form, these include particle emissions, also referred to as "diesel soot" or "soot particles." These are complex agglomerates from predominantly carbonaceous particulate matter and an adhering liquid phase, which usually preponderantly consists of longer-chained hydrocarbon condensates. The liquid phase adhering to the solid components is also referred to as "Soluble Organic Fraction SOF" or "Volatile Organic Fraction VOF."

To clean these exhaust gases, the aforementioned components must be converted to harmless compounds as completely as possible. This is only possible with the use of suitable catalysts.

Soot particles may be very effectively removed from the exhaust gas with the aid of particle filters. Wall-flow filters made from ceramic materials have especially proven themselves. These wall-flow filters are made up of a plurality of parallel channels that are formed by porous walls. The channels are alternately sealed at one of the two ends of the filter so that first channels are formed that are open at the first side of the filter and sealed at the second side of the filter, and second channels are formed that are sealed at the first side of the filter and open at the second side of the filter. The exhaust gas flowing into the first channels, for example, may leave the filter again only via the second channels and must flow through the porous walls between the first and second channels for this purpose. The particles are retained when the exhaust gas passes through the wall.

It is known that particle filters may be provided with catalytically-active coatings. EP1820561 A1 describes, for example, the coating of a diesel particle filter having a catalyst layer which facilitates the burning off of filtered soot particles.

A known method for removing nitrogen oxides from exhaust gases in the presence of oxygen is selective catalytic reduction (SCR method) by means of ammonia on a suitable catalyst. In this method, the nitrogen oxides to be removed from the exhaust gas are converted to nitrogen and water using ammonia.

Iron-exchanged and, in particular, copper-exchanged zeolites, for example, may be used as SCR catalysts; see, for example, WO2008/106519 A1, WO2008/118434 A1, and WO2008/132452 A2.

SCR catalysts for converting nitrogen oxides with ammonia contain no precious metals—in particular, no platinum or palladium. In the presence of these metals, the oxidation of ammonia with oxygen to form nitrogen oxides would actually take place preferentially, and the SCR reaction (reaction of ammonia with nitrogen oxide) would fall behind. Insofar as the literature occasionally refers to platinum-exchanged or palladium-exchanged zeolites as "SCR catalysts," this does not relate to the $NH_3$-SCR reaction, but rather to the reduction of nitrogen oxides by means of hydrocarbons. However, the latter reaction is only slightly selective, so that it is more accurately referred to as "HC-DeNOx reaction" instead of "SCR reaction."

The ammonia used as reducing agent may be made available by feeding an ammonia precursor compound, e.g., urea, ammonium carbamate, or ammonium formate, into the exhaust gas stream, and by subsequent hydrolysis.

The disadvantage of SCR catalysts is that they only work from an exhaust gas temperature of approx. 180 to 200° C. and do not, therefore, convert nitrogen oxides that are formed in the engine's cold-start phase.

In order to remove the nitrogen oxides, so-called nitrogen oxide storage catalysts are also known, for which the term, "Lean NOx Trap," or LNT, is common. Their cleaning action is based upon the fact that in a lean operating phase of the engine, the nitrogen oxides are predominantly stored in the form of nitrates by the storage material of the storage catalyst, and the nitrates are broken down again in a subsequent rich operating phase of the engine, and the nitrogen oxides which are thereby released are converted with the reducing exhaust gas components in the storage catalyst to nitrogen, carbon dioxide, and water. This operating principle is described in, for example, SAE document SAE 950809.

As storage materials, oxides, carbonates, or hydroxides of magnesium, calcium, strontium, barium, alkali metals, rare earth metals, or mixtures thereof come, in particular, into consideration. As a result of their alkaline properties, these compounds are able to form nitrates with the acidic nitrogen oxides of the exhaust gas and to store them in this way. They are deposited in the most highly dispersed form possible on suitable substrate materials in order to produce a large interaction surface with the exhaust gas. In addition, nitrogen oxide storage catalysts generally contain precious metals such as platinum, palladium, and/or rhodium as catalytically-active components. It is their purpose to, on the one hand, oxidize NO to $NO_2$, as well as CO and HC to $CO_2$, under lean conditions and to, on the other hand, reduce released $NO_2$ to nitrogen during the rich operating phases, in which the nitrogen oxide storage catalyst is regenerated.

Modern nitrogen oxide storage catalysts are described in, for example, EP0885650 A2, US2009/320457, WO2012/029050 A1, and WO2016/020351 A1.

It is already known to combine soot particle filters and nitrogen oxide storage catalysts. EP1420 149 A2 and US2008/141661, for example, thus describe systems comprising a diesel particle filter and a nitrogen oxide storage catalyst arranged downstream.

Moreover, EP1393069 A2, EP1433519 A1, EP2505803 A2, and US2014/322112, for example, already propose that particle filters be coated with nitrogen oxide storage catalysts.

US2014/322112 describes a zoning of the coating of the particle filter with a nitrogen oxide storage catalyst, such that one zone starting from the upstream end of the particle filter is located in the input channels, and another zone starting from the downstream end of the particle filter is located in the output channels.

The procedure described in SAE Technical Paper 950809, in which the nitrogen oxides are stored by a nitrogen oxide storage catalyst in a lean-burn operating phase of the engine and are released again in a subsequent rich operating phase, is also referred to as active nitrogen oxide storage.

In addition, a method known as passive nitrogen oxide storage has also been described. Nitrogen oxides are stored thereby in a first temperature range and released again in a second temperature range, wherein the second temperature range lies at higher temperatures than the first temperature range. Passive nitrogen oxide storage catalysts are used to implement this method, which catalysts are also referred to as PNA (for "passive NOx adsorbers").

By means of passive nitrogen oxide storage catalysts, nitrogen oxides may—particularly at temperatures below 200° C., at which an SCR catalyst has not yet reached its operating temperature—be stored and released again as soon as the SCR catalyst is ready for operation. Thus, an increased total nitrogen oxide conversion is realized in the exhaust gas after-treatment system by the interim storage below 200° C. of the nitrogen oxides emitted by the engine, as well as the concerted release of those nitrogen oxides above 200° C.

Palladium supported on cerium oxide has been described as a passive nitrogen oxide storage catalyst (see, for example, WO2008/047170 A1 and WO2014/184568 A1), which, according to WO2012/071421 A2 and WO2012/156883 A1, may also be coated on a particle filter.

JP 2016-052637 A discloses exhaust gas purifying catalysts which are capable of combusting particulate material at low temperatures and which comprise carrier particles which are formed from tin oxide and cerium oxide.

US2015/226718 discloses hydrogen-selective porous composites which comprise cerium oxide and tin oxide. In addition, they may include lanthanum doped ceria and a noble metal which may be palladium.

Vasile et al. in Applied Catalysis B: Environmental 140-141 (2013) 25-31 discloses cerium-tin mixed oxides and their electrical and catalytic properties in CO depollution reaction.

CN 104475006 B discloses an adsorbent for storage of nitrogen oxides of Diesel engines and lean burn gasoline engines which comprise 24-24.4 wt % of $MnO_x$, 35-60.6 wt % of $SnO_2$ and 13.9-41 wt % of $CeO_2$.

Modern and future diesel engines are becoming more and more efficient, as a result of which exhaust gas temperatures are falling. In parallel, the legislation on the conversion of nitrogen oxides is becoming increasingly stringent. The result is that SCR catalysts alone no longer suffice to meet the nitrogen oxide limits. In particular, there continues to be further need for technical solutions that ensure that nitrogen oxides formed during the engine's cold-start phase do not escape into the environment.

It has now been found that improved materials for low temperature nitrogen oxide storage are obtained, if metal oxides comprising cerium and tin are used to support palladium.

Accordingly, the present invention relates to a composite metal oxide which comprises
  80 to 97 wt %, in relation to the weight of the composite metal oxide, of one or more oxides of cerium and
  3 to 20 wt %, in relation to the composite metal oxide of a metal oxide comprising tin oxide ($SnO_2$) and lanthanum oxide ($La_2O_3$) and/or aluminum oxide ($Al_2O_3$).

The composite metal oxide of the present invention preferably comprises
  84 to 96 wt %, in particular 90 to 96 wt %, in relation to the weight of the composite metal oxide, of one or more oxides of cerium and
  4 to 16 wt %, in particular 4 to 10 wt %, in relation to the composite metal oxide of a metal oxide comprising tin oxide ($SnO_2$) and lanthanum oxide ($La_2O_3$) and/or aluminum oxide ($Al_2O_3$).

In a preferred embodiment, the metal oxide consists of tin oxide ($SnO_2$) and lanthanum oxide ($La_2O_3$). In this case, the weight ratio of tin oxide ($SnO_2$) and lanthanum oxide ($La_2O_3$) is preferably 4:1 to 1:6, more preferably 4:1 to 1:1.7 and still more preferably 4:1 to 1:1.5.

In another preferred embodiment, the metal oxide consists of tin oxide ($SnO_2$) and aluminum oxide ($Al_2O_3$). In this case, the weight ratio of tin oxide ($SnO_2$) and aluminum oxide ($Al_2O_3$) is preferably 6:1 to 1:3, more preferably 5:1 to 1:1.5.

In still another preferred embodiment, the metal oxide consists of tin oxide ($SnO_2$), lanthanum oxide ($La_2O_3$) and aluminum oxide ($Al_2O_3$). In this case, the weight ratio of tin oxide ($SnO_2$), lanthanum oxide ($La_2O_3$) and aluminum oxide ($Al_2O_3$) is preferably 4:1:0.5 to 1:6:1, more preferably 4:1:0.3 to 1:1.5:0.5.

In still another preferred embodiment, the metal oxide comprises tin oxide ($SnO_2$) and lanthanum oxide ($La_2O_3$). In this case, the weight ratio of tin oxide ($SnO_2$) and lanthanum oxide ($La_2O_3$) is preferably 4:1 to 1:6, more preferably 4:1 to 1:1.7 and still more preferably 4:1 to 1:1.5.

In an embodiment of the present invention the composite metal oxide does not comprise lanthanum doped ceria.

The term "one or more oxides of cerium" takes into account that cerium (IV)oxide ($CeO_2$) and cerium(III)oxide ($Ce_2O_3$) are interconvertible depending i.a. on the amount of oxygen available in the area surrounding it. Accordingly, "one or more oxides of cerium" usually means a mixture of $CeO_2$ and $Ce_2O_3$ with varying ratios. If the term $CeO_2$ is used within this specification it is understood that it may comprise a certain amount of $Ce_2O_3$.

The composite metal oxide of the present invention can be manufactured by processes that are basically known to the person of skill in the art. For example, a composite material comprising cerium oxide and tin oxide can be obtained by impregnating cerium oxide with a water soluble or partially water-soluble salt of tin, for example tin acetate. If a lanthanum oxide containing composite metal oxide is to be obtained, lanthanum acetate can be added to the impregnation solution.

The composite metal oxide according to the present invention can serve as a support for palladium to form a composite material.

Accordingly, the present invention in addition relates to a composite material for the storage of nitrogen oxides comprising a composite metal oxide as described above and palladium.

In particular, the present invention relates to a composite material for the storage of nitrogen oxides comprising a composite metal oxide and palladium wherein the composite metal oxide comprises
  80 to 97 wt %, in relation to the weight of the composite metal oxide, of one or more oxides of cerium and
  3 to 20 wt %, in relation to the composite metal oxide of a metal oxide comprising tin oxide ($SnO_2$) and lanthanum oxide ($La_2O_3$) and/or aluminum oxide ($Al_2O_3$).

The palladium is preferably present as palladium metal and/or as palladium oxide in or on the surface of the composite metal oxide.

The palladium may be present in quantities of 0.01 to 20 wt % in relation to the weight of the composite material and calculated as palladium metal.

Palladium is preferably present in quantities of 0.5 to 10 wt %—particularly preferably, of 0.5 to 4 wt %, and, very particularly preferably, of 0.5 to 2 wt %—in relation to the weight of the composite material and calculated as palladium metal.

In an embodiment of the composite material according to the invention it does comprise neither copper, nor iron, nor platinum.

The terms "composite material" and "composite oxide", respectively, within the meaning of the present invention exclude physical mixtures as well as solid solutions of its components. Rather, these terms stand for products which are characterized by a three-dimensional structure, which comprises areas where one component remains separate to a large extent and other areas where another component remains separate to a large extent.

The composite material of the present invention can be manufactured by processes that are basically known to the person of skill in the art. For example, a composite material comprising palladium, cerium oxide and tin oxide, can be obtained by impregnating palladium carrying cerium oxide with a water soluble or partially water-soluble salt of tin, for example tin acetate. If a lanthanum oxide containing composite material is to be obtained, lanthanum acetate can be added to the impregnation solution.

In an embodiment of the composite metal oxide according to the invention, it is present in the form of a coating on a carrier substrate of the length L. The coating may thereby extend over the entire length L of the carrier substrate or only over a section thereof.

Likewise, in an embodiment of the composite material according to the invention, it is present in form of a coating on a carrier substrate of the length L. The coating may thereby extend over the entire length L of the carrier substrate or only over a section thereof.

The carrier substrate may be a flow-through substrate or a wall-flow filter. A wall-flow filter is a supporting body that comprises channels of length L which extend in parallel between a first and a second end of the wall-flow filter, which are alternatingly sealed either at the first or second end, and which are separated by porous walls. A flow-through substrate differs from a wall-flow filter, in particular, in that the channels of length L are open at its two ends.

In an uncoated state, wall-flow filters have, for example, porosities of 30 to 80%—in particular, 50 to 75%. In the uncoated state, their average pore size is 5 to 30 micrometers, for example.

Generally, the pores of the wall-flow filter are so-called open pores, i.e., they have a connection to the channels. Furthermore, the pores are normally interconnected with one another. This enables easy coating of the inner pore surfaces, on the one hand, and an easy passage of the exhaust gas through the porous walls of the wall-flow filter, on the other. Flow-through substrates are known to the person skilled in the art, as are wall-flow filters, and are commercially available. They consist, for example, of silicon carbide, aluminum titanate, or cordierite.

In the case of a wall-flow filter, the coating may be situated on the surfaces of the input channels, on the surfaces of the output channels, and/or in the porous wall between the input and output channels.

Carrier substrates comprising the composite metal oxide and the composite material, respectively, in form of a coating, may be produced according to the methods familiar to the person skilled in the art, such as according to the usual dip coating methods or pump and suck coating methods using aqueous suspensions of the composite material (washcoats) with subsequent thermal post-treatment (calcination). A person skilled in the art knows that, in the case of wall-flow filters, their average pore size and the average particle size of the composite metal oxide and the composite material, respectively, to be coated can be adapted to each other such that they lie on the porous walls that form the channels of the wall-flow filter (on-wall coating). The average particle sizes of the materials to be coated may, however, be selected such that said materials are located in the porous walls that form the channels of the wall-flow filter so that the inner pore surfaces are thus coated (in-wall coating). In this instance, the average particle size of the materials to be coated must be small enough to penetrate the pores of the wall-flow filter.

In one embodiment of the present invention, the composite material of the present invention is coated over the entire length L of the carrier substrate, wherein no further catalytically-active coating is found on the carrier substrate.

In other embodiments of the present invention, the carrier substrate may, however, also carry one or more further catalytically-active coatings.

For example, the carrier substrate may, in addition to a coating comprising the composite material of the present invention, comprise a further coating which is oxidation-catalytically active.

The oxidation-catalytically-active coating comprises, for example, platinum, palladium, or platinum and palladium on a carrier material. In the latter case, the mass ratio of platinum to palladium is, for example, 4:1 to 14:1. All materials that are familiar to the person skilled in the art for this purpose are considered as carrier materials. They have a BET surface of 30 to 250 m$^2$/g—preferably, of 100 to 200 m$^2$/g (specified according to DIN 66132)—and are, in particular, aluminum oxide, silicon oxide, magnesium oxide, titanium oxide, and mixtures or mixed oxides of at least two of these materials.

Aluminum oxide, magnesium/aluminum mixed oxides, and aluminum/silicon mixed oxides are preferred. If aluminum oxide is used, it is particularly preferable that it be stabilized, e.g., with 1 to 6 wt %—in particular, 4 wt %—lanthanum oxide.

The coating comprising the composite material of the present invention (hereinafter referred to as coating A) and the oxidation-catalytically-active coating (hereinafter referred to as coating B) may be arranged on the carrier substrate in various ways.

If the carrier substrate is a flow-through substrate, both coatings may, for example, be present coated over the entire length L or only over a section of the carrier substrate.

For example, coating A, starting from an end of the supporting body, may extend over 10 to 80% of its length L, and coating B, starting from another end of the supporting body, over 10 to 80% of its length $L_A$. In this case, it may be that $L=L_A+L_B$ applies, wherein $L_A$ is the length of the coating A, and $L_B$ is the length of the coating B. However, $L<L_A+L_B$ may also apply. In this case, coatings A and B overlap. Finally, $L>L_A+L_B$ may also apply if a section of the supporting body remains free of coatings. In the latter case, a gap remains between coatings A and B, which gap is at least 0.5 cm long, i.e., for example, 0.5 to 1 cm.

However, coatings A and B may both also be coated over the entire length L. In this case, coating B, for example, may be present directly on the carrier substrate, and coating A on coating B. Alternatively, coating A may also be present directly on the carrier substrate, and coating B on coating A.

It is further possible that one coating extends over the entire length of the supporting body and the other over only a section thereof.

If the carrier substrate is a wall-flow filter, coatings A and B may extend over the entire length L of the wall-flow filter or over only a section thereof in a manner analogous to that described above for flow-through substrates. In addition, the coatings may be on the walls of the input channels, on the walls of the output channels, or in the walls between input and output channels.

The composite material of the present invention is especially suitable as a low temperature nitrogen oxide storage catalyst, for example as a passive nitrogen oxide storage catalyst. Accordingly, it is able to store nitrogen oxides at temperatures below 200° C. and to withdraw them again at temperatures above 200° C. It is, therefore, possible, in combination with a downstream SCR catalyst, to effectively convert nitrogen oxides across the entire temperature range of the exhaust gas, including the cold-start temperatures.

The present invention therefore relates to an exhaust gas system comprising
a) a composite material of the present invention coated on a carrier substrate of length L, and
b) an SCR catalyst.

In principle, the SCR catalyst in the exhaust gas system according to the invention may be selected from all the active catalysts in the SCR reaction of nitrogen oxides with ammonia—particularly such as are commonly known to the person skilled in the art in the field of automotive exhaust gas catalysis. This includes catalysts of the mixed-oxide type, as well as catalysts based upon zeolites—in particular, upon transition metal-exchanged zeolites.

In embodiments of the present invention, SCR catalysts are used that contain a small-pore zeolite with a maximum ring size of eight tetrahedral atoms and a transition metal. Such SCR catalysts are described in, for example, WO2008/106519 A1, WO2008/118434 A1, and WO2008/132452 A2.

In addition, however, large-pore and medium-pore zeolites may also be used, wherein those of the BEA structural type, in particular, come into question. Thus, iron-BEA and copper-BEA are of interest.

Particularly preferred zeolites belong to the BEA, AEI, AFX, CHA, KFI, ERI, LEV, MER, or DDR structure types and are particularly preferably exchanged with cobalt, iron, copper, or mixtures of two or three of these metals.

The term, zeolites, here also includes molecular sieves, which are sometimes also referred to as "zeolite-like" compounds. Molecular sieves are preferred, if they belong to one of the aforementioned structure types. Examples include silica aluminum phosphate zeolites, which are known by the term, SAPO, and aluminum phosphate zeolites, which are known by the term, AlPO.

These too are particularly preferred, when they are exchanged with cobalt, iron, copper, or mixtures of two or three of these metals.

Preferred zeolites are also those that have an SAR (silica-to-alumina ratio) value of 2 to 100—in particular, 5 to 50.

The zeolites or molecular sieves contain transition metal—in particular, in quantities of 1 to 10 wt %, and especially 2 to 5 wt %—calculated as metal oxide, i.e., for example, as $Fe_2O_3$ or CuO.

Preferred embodiments of the present invention contain beta-type (BEA), chabazite-type (CHA), or Levyne-type (LEV) zeolites or molecular sieves exchanged with copper, iron, or copper and iron as SCR catalysts. Appropriate zeolites or molecular sieves are known, for example, by the names, ZSM-5, Beta, SSZ-13, SSZ-62, Nu-3, ZK-20, LZ-132, SAPO-34, SAPO-35, AlPO-34, and AlPO-35; see, for example, U.S. Pat. Nos. 6,709,644 and 8,617,474.

In an embodiment of the exhaust gas system according to the invention an injection device for reducing agent is located between the catalyst, which a carrier substrate of length L, palladium, and a zeolite whose largest channels are formed by 8 tetrahedrally-coordinated atoms, and the SCR catalyst.

The person skilled in the art may choose the injection device arbitrarily, wherein suitable devices may be found in the literature (see, for example, T. Mayer, Feststoff-SCR-System auf Basis von Ammoniumcarbamat (Solid SCR System Based upon Ammonium Carbamate), Dissertation, TU Kaiserslautern, 2005). The ammonia as such or in the form of a compound may be introduced via the injection device into the exhaust gas flow from which ammonia is formed under the ambient conditions prevailing. As such, aqueous solutions of urea or ammonium formiate, for example, come into consideration, as does solid ammonium carbamate. As a rule, the reducing agent or precursor thereof is held available in an accompanying container which is connected to the injection device.

The SCR catalyst is preferably present in the form of a coating on a supporting body, which may be a flow-through substrate or a wall-flow filter and may, for example, consist of silicon carbide, aluminum titanate, or cordierite.

Alternatively, however, the supporting body itself may consist of the SCR catalyst and a matrix component, i.e., be present in extruded form.

The present invention also relates to a method for the cleaning of exhaust gases from motor vehicles that are operated by lean-burn engines, e.g., diesel engines, which method is characterized in that the exhaust gas is channeled through an exhaust gas system according to the invention.

EXAMPLES 1 TO 4 (NOT ACCORDING TO THE INVENTION)

Composite metal oxides comprising $CeO_2$ and $SnO_2$ were obtained by adding an appropriate amount of $CeO_2$ to an aqueous solution of an appropriate amount of tin acetate, stirring the mixture 120° C. for 2 hours and maintaining it at 120° C. for further 8 hours. Subsequently the product obtained was milled, evaporated of water and calcined in air at 500° C. for 5 hours. The following products were obtained:
Example 1: 95.8 wt % of $CeO_2$; 4.2 wt % of $SnO_2$
Example 2: 88.4 wt % of $CeO_2$; 11.6 wt % of $SnO_2$
Example 3: 85.1 wt % of $CeO_2$; 14.9 wt % of $SnO_2$
Example 4: 92 wt % of $CeO_2$; 8 wt % of $SnO_2$

EXAMPLES 5 TO 11

Composite metal oxides comprising $CeO_2$, $SnO_2$ and $La_2O_3$ were obtained by adding an appropriate amount of $CeO_2$ to an aqueous solution comprising appropriate amounts of tin acetate and lanthanum acetate, stirring the mixture 120° C. for 2 hours and maintaining it at 120° C. for further 8 hours. Subsequently the product obtained was milled, separated from the liquid, dried and calcined in air at 500° C. for 5 hours. The following products were obtained:
Example 5: 84.33 wt % of $CeO_2$; 3.7 wt % of $SnO_2$; 11.97 of $La_2O_3$
Example 6: 84.84 wt % of $CeO_2$; 11.14 wt % of $SnO_2$; 4.02 of $La_2O_3$
Example 7: 84.6 wt % of $CeO_2$; 7.4 wt % of $SnO_2$; 8 of $La_2O_3$
Example 8: 95.64 wt % of $CeO_2$; 2.1 wt % of $SnO_2$; 2.26 of $La_2O_3$
Example 9: 91.83 wt % of $CeO_2$; 6.43 wt % of $SnO_2$; 1.74 of $La_2O_3$
Example 10: 91.71 wt % of $CeO_2$; 4.82 wt % of $SnO_2$; 3.47 of $La_2O_3$
Example 11: 91.58 wt % of $CeO_2$; 3.22 wt % of $SnO_2$; 5.2 of $La_2O_3$

EXAMPLES 12 TO 22 (EXAMPLES 12-15 NOT ACCORDING TO THE INVENTION)

The procedures described above for the manufacture of the composite metal oxides of the Examples 1 to 11 were repeated with the exception that $CeO_2$ supporting 1.5 wt % of palladium (based on the total weight of $CeO_2$ and palladium) was used instead of $CeO_2$ alone. The respective composite materials of Examples 12 to 22 were obtained.

COMPARISON EXAMPLE 1

Comparison Example 1 is $CeO_2$ supporting 1.5 wt % of palladium (based on the total weight of $CeO_2$ and palladium) as commercially available.

Comparison Tests a) The products of Comparison Example 1 and Examples 12 to 22 were aged for 16 hours at 800° C. in hydrothermal conditions.

b) The NOx storage capacity of the samples obtained above under a) was determined using the following method:

i) The samples were subjected to an increase of temperature of 10K/min until 550° C. in a lean atmosphere (see Phase 1 in the table below) followed by a cooldown to 100° C.

ii) After that a gas composition comprising NO and NO2 was flown over the samples until full saturation with NOx was observed (see Phase 2 of the table below).

|  | Phase 1<br>Pre-treatment<br>RT to 550° C. | Phase 2<br>NOx storage |
|---|---|---|
| GHSV [1/h] | 50000 | 50000 |
| NO [ppm] | 0 | 50 |
| $NO_2$ [ppm] | 0 | 50 |
| $O_2$ [vol %] | 8 | 8 |
| $CO_2$ [vol %] | 10 | 10 |
| $H_2O$ [vol %] | 5 | 5 |

The results obtained are as follows:

| Example | NOx max. [mg] | NOx 80% conv. [mg] | NOx 60% conv. [mg] |
|---|---|---|---|
| Example 12 | 8.01 | 3.21 | 5.07 |
| Example 13 | 7.90 | 2.99 | 4.87 |
| Example 14 | 7.64 | 2.58 | 4.61 |
| Example 15 | 7.85 | 3.68 | 5.13 |
| Example 16 | 7.45 | 2.19 | 4.10 |
| Example 17 | 7.95 | 3.31 | 4.95 |
| Example 18 | 7.91 | 3.29 | 4.76 |
| Example 19 | 8.22 | 3.11 | 5.27 |
| Example 20 | 8.24 | 3.61 | 5.33 |
| Example 21 | 8.39 | 3.88 | 5.60 |
| Example 22 | 8.22 | 3.49 | 5.36 |
| Comparison Example 1 | 7.23 | 2.35 | 4.32 |

The invention claimed is:

1. Composite metal oxide which comprises:
    80 to 97 wt %, in relation to the weight of the composite metal oxide, of one or more oxides of cerium; and
    3 to 20 wt %, in relation to the weight of the composite metal oxide, of a metal oxide comprising:
    (i) tin oxide ($SnO_2$), and
    (ii) one or both of lanthanum oxide ($La_2O_3$) and aluminum oxide ($Al_2O_3$).

2. Composite metal oxide according to claim 1 which comprises:
    84 to 96 wt %, in relation to the weight of the composite metal oxide, of the one or more oxides of cerium; and
    4 to 16 wt %, in relation to the weight of the composite metal oxide, of the metal oxide comprising (i) and (ii).

3. Composite metal oxide according to claim 1, wherein the metal oxide consists of tin oxide ($SnO_2$) and lanthanum oxide ($La_2O_3$).

4. Composite metal oxide according to claim 3, wherein the weight ratio of tin oxide ($SnO_2$) and lanthanum oxide ($La_2O_3$) is 4:1 to 1:1.5.

5. Composite material for the storage of nitrogen oxides comprising a composite metal oxide according to claim 4 and palladium.

6. Composite material according to claim 5, wherein the palladium is present in quantities of 0.01 to 20 wt % in relation to the weight of the composite material and calculated as palladium metal.

7. Composite material according to claim 5, wherein the composite material is present in form of a coating on a carrier substrate of the length L.

8. Composite material according to claim 7, wherein the carrier substrate comprises a further coating which is oxidation-catalytically active.

9. Composite material according to claim 8, wherein the oxidation-catalytically-active coating comprises platinum or palladium, or platinum and palladium on a carrier material.

10. Exhaust gas system comprising
    a) a composite material according to claim 5 and
    b) an SCR catalyst.

11. Exhaust gas system according to claim 10, wherein the SCR catalyst is a zeolite which belongs to the framework type, BEA, AEI, AFX, CHA, KFI, ERI, LEV, MER, or DDR, and which is exchanged with cobalt, iron, copper, or mixtures of two or three of these metals.

12. Method for cleaning exhaust gases from motor vehicles that are operated with lean-burn engines, wherein the exhaust gas is channeled through an exhaust gas system according to claim 10.

13. Composite metal oxide according to claim 2 which comprises 90 to 96 wt % of the one or more oxides of cerium.

14. Composite metal oxide according to claim 13 which comprises 4 to 10 wt % of the metal oxide comprising (i) and (ii).

15. Composite metal oxide according to claim 2 which comprises 4 to 10 wt % of the metal oxide comprising (i) and (ii).

16. Exhaust gas system comprising
    a) a carrier substrate of length L with a coating comprising the composite metal oxide according to claim 1, and
    b) an SCR catalyst.

17. Exhaust gas system according to claim 16, wherein the carrier substrate is a flow-through substrate.

18. Exhaust gas system comprising
    a) a carrier substrate of length L with a coating comprising the composite material according to claim 5, and
    b) an SCR catalyst.

19. Exhaust gas system according to claim 18, wherein the carrier substrate is a flow-through substrate.

20. Exhaust gas system according to claim 19, wherein the carrier substrate comprises a further coating which is oxidation-catalytically active, wherein the oxidation-catalytically-active coating comprises platinum or palladium, or platinum and palladium.

* * * * *